(12) United States Patent
Arold et al.

(10) Patent No.: US 10,736,180 B2
(45) Date of Patent: Aug. 4, 2020

(54) HEATER WITH AN OPTICAL SENSOR FOR OVER-TEMPERATURE PROTECTION

(71) Applicant: TUTCO, LLC, Cookeville, TN (US)

(72) Inventors: Jonathan B. Arold, Exeter, NH (US); Ronald T. Rittenhouse, Dover, NH (US); Ann M. Libby, Madbury, NH (US)

(73) Assignee: TUTCO LLC, Cookeville, TN (US)

( * ) Notice: Subject to any disclaimer, the term of this patent is extended or adjusted under 35 U.S.C. 154(b) by 248 days.

(21) Appl. No.: 15/582,274

(22) Filed: Apr. 28, 2017

(65) Prior Publication Data

US 2018/0317281 A1 Nov. 1, 2018

(51) Int. Cl.
| H05B 1/02 | (2006.01) |
| G01J 5/06 | (2006.01) |
| G01J 5/04 | (2006.01) |
| G01J 5/00 | (2006.01) |

(52) U.S. Cl.
CPC .......... *H05B 1/0291* (2013.01); *G01J 5/0044* (2013.01); *G01J 5/041* (2013.01); *G01J 5/043* (2013.01); *G01J 5/061* (2013.01)

(58) Field of Classification Search
CPC .. G01J 5/044; G01J 5/041; G01J 5/043; G01J 5/061; G01K 7/02; G01K 7/22
USPC ........................................................ 219/502
See application file for complete search history.

(56) References Cited

U.S. PATENT DOCUMENTS

| 5,212,763 | A | 5/1993 | Arold et al. | |
| 6,281,481 | B1 | 8/2001 | Tiemann | |
| 6,355,913 | B1 * | 3/2002 | Authier | A61H 33/00 219/481 |
| 6,462,316 | B1 * | 10/2002 | Berkcan | H05B 3/746 219/447.1 |
| 6,538,238 | B1 * | 3/2003 | Berkcan | H05B 3/746 219/446.1 |
| 6,563,092 | B1 * | 5/2003 | Shrinivasan | H01L 21/67248 118/725 |
| 7,180,039 | B2 | 2/2007 | Arold et al. | |
| 7,374,335 | B2 * | 5/2008 | Gotthold | G01J 5/0003 374/131 |
| 7,380,982 | B2 * | 6/2008 | Lohokare | G01K 11/06 250/337 |
| 7,946,759 | B2 * | 5/2011 | Davis | G01J 5/0003 374/121 |
| 8,702,306 | B2 * | 4/2014 | Mowry, Jr. | G01K 7/14 374/179 |
| 9,035,223 | B2 * | 5/2015 | Noguchi | H05B 6/062 219/627 |

(Continued)

FOREIGN PATENT DOCUMENTS

| CN | 1428599 | 7/2003 |
| JP | 4969732 | 7/2012 |

*Primary Examiner* — Craig M Schneider
*Assistant Examiner* — David R Deal
(74) *Attorney, Agent, or Firm* — Clark & Brody LP

(57) ABSTRACT

A heater with an optical sensor for over-temperature protection. The heater includes a heating element and a sensor assembly including a coupler and an optical sensor. Wavelengths emanating from the heating element passes directly through the coupler to the optical sensor. The optical sensor provides an over-temperature feedback signal for limiting power to the heating element to avoid an over-temperature condition for the heating element.

16 Claims, 3 Drawing Sheets

(56) References Cited

U.S. PATENT DOCUMENTS

| | | | | |
|---|---|---|---|---|
| 2001/0038005 A1* | 11/2001 | Hauf | ................... | G01J 5/0003 |
| | | | | 219/502 |
| 2002/0070211 A1* | 6/2002 | Berkcan | ................ | H05B 3/746 |
| | | | | 219/502 |
| 2003/0094448 A1 | 5/2003 | Shukla et al. | | |
| 2010/0260229 A1 | 10/2010 | Grubb et al. | | |
| 2015/0055940 A1* | 2/2015 | Steinhauser | ........ | H01L 21/6831 |
| | | | | 392/307 |
| 2015/0253194 A1* | 9/2015 | Van Buggenhout | .... | G01J 5/045 |
| | | | | 250/353 |
| 2015/0371881 A1* | 12/2015 | Du Bois | ........... | H01L 21/67248 |
| | | | | 374/141 |

\* cited by examiner

HEATER WITH AN OPTICAL SENSOR FOR OVER-TEMPERATURE PROTECTION

TECHNICAL FIELD

The present invention relates to heaters, and more specifically, to heaters including over-temperature protection.

BACKGROUND

Heaters are used in a wide variety of industrial, commercial and consumer applications. A heater generally includes one or more heating elements energized by a power source to emanate heat for use in the application.

SUMMARY

One challenge associated with heaters involves maintaining the input energy to the heater below a level that will cause an over-temperature condition. Changes in the line voltage from the power source, for example, can cause an over-temperature condition for the heater. An over-temperature condition can cause permanent damage to the heating element(s).

Prior attempts to avoid an over-temperature condition in a heater involved use of thermocouples to monitor the heating elements. The thermocouples are positioned near the heating elements and provide feedback representative of the temperature of the heating elements. A controller may adjust the drive power to a heater in response to the feedback from the thermocouple to maintain a desired temperature and/or avoid an over-temperature condition.

Unfortunately, thermocouples may require a minimum airflow in the system to function reliably. If the airflow across the thermocouple is below a minimum level, the thermocouple may not detect a temperature rise in a heating element quickly enough to prevent an over-temperature condition and damage to the heating element. Even in systems where there is sufficient air flow for a thermocouple, response times for thermocouples and/or the controller may not be fast enough in some systems to prevent an over-temperature condition.

Infrared sensors have also been used in attempts to avoid an over-temperature condition in a heater. In a known configuration, an infrared sensor is positioned to indirectly sense light emanated from a heater and transmitted along a glass tube in which the heater is disposed. Again, however, the infrared sensor may not sense a temperature rise in the heating element quickly enough to prevent an over-temperature condition.

In an embodiment, there is provided a system. The system includes: a heating element; a sensor assembly, the sensor assembly including a coupler having a sight opening configured to receive a heating element wavelength directly from the heating element, and an optical sensor configured to receive the heating element wavelength directly through the sight opening of the coupler, the optical sensor being configured to provide an over-temperature feedback signal in response to the heating element wavelength, the over-temperature feedback signal being representative of a temperature of the heating element; and a heater control unit configured to drive the heating element to a desired temperature, the heater control unit being further configured to limit power delivered to the heating element in response to the over-temperature feedback signal.

In a related embodiment, the sight opening may have a central axis that intersects a region defined by the outside dimension of the heating element. In another related embodiment, the heating element may be disposed in a housing having an opening therein, and the coupler may be coupled to the housing to receive the heating element wavelength through the opening.

In still another related embodiment, the system may further include a temperature sensor configured to provide a temperature feedback signal to heater control unit, the heater control unit being configured to drive the heating element to the desired temperature in response to the temperature feedback signal. In yet another related embodiment, the optical sensor may be an infrared (IR) sensor.

In still yet another related embodiment, the heater control unit may include a power control unit and a power limiter, the power control unit configured to provide a control signal to drive the heating element to the desired temperature and the power limiter configured to limit power delivered to the heating element by limiting the control signal in response to the over-temperature feedback signal. In a further related embodiment, the heater control unit may further include a switch configured to switch power from a power supply to the heating element in response to the control signal from the power control unit. In another further related embodiment, the system may further include a temperature sensor configured to provide a temperature feedback signal to the power control unit, the power control unit being configured to provide the control signal in response to the temperature feedback signal.

In yet still another related embodiment, the coupler may be coupled to the optical sensor through a bracket. In a further related embodiment, an air gap may be provided between the coupler and the optical sensor.

In still another related embodiment, the system may further include a coolant hose coupled to the optical sensor to provide a coolant to the sensor.

In another embodiment, there is provided a system. The system includes: a heating element disposed in a housing, the housing having an opening therein; a sensor assembly, including: a coupler coupled to the housing and having a sight opening configured to receive heating element wavelength directly from the heating element through the opening in the housing, the sight opening having a central axis that intersects a region defined by an outside dimension of the heating element; and an optical sensor configured to receive the heating element wavelength directly through the sight opening of the coupler, the optical sensor being configured to provide an over-temperature feedback signal in response to the heating element wavelength, the over-temperature feedback signal being representative of a temperature of the heating element; a temperature sensor configured to provide a temperature feedback signal; and a heater control unit configured to drive the heating element to a desired temperature in response to the temperature feedback signal, the heater control unit being further configured to limit power delivered to the heating element in response to the over-temperature feedback signal.

In a related embodiment, the heater control unit may include a power control unit and a power limiter, the power control unit configured to provide a control signal to drive the heating element to the desired temperature and the power limiter configured to limit power delivered to the heating element by limiting the control signal in response to the over-temperature feedback signal. In a further related embodiment, the heater control unit may further include a switch configured to switch power from a power supply to the heating element in response to the control signal from the power control unit.

In another embodiment, there is provided a method of protecting a heating element from an over-temperature condition. The method includes: delivering power from a power supply to the heating element to achieve a desired temperature of the heating element; receiving wavelength directly from the heating element; sensing the wavelength to provide a temperature feedback signal representative of an actual temperature of the heating element; and limiting the power delivered from the power supply to the heating element in response to the temperature feedback signal when the actual temperature of the heating element exceeds a predetermined over-temperature threshold.

In a related embodiment, the method may further include sensing a temperature of the heating element to provide a temperature feedback signal, wherein power is delivered from the power supply in response to the temperature feedback signal.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1A:
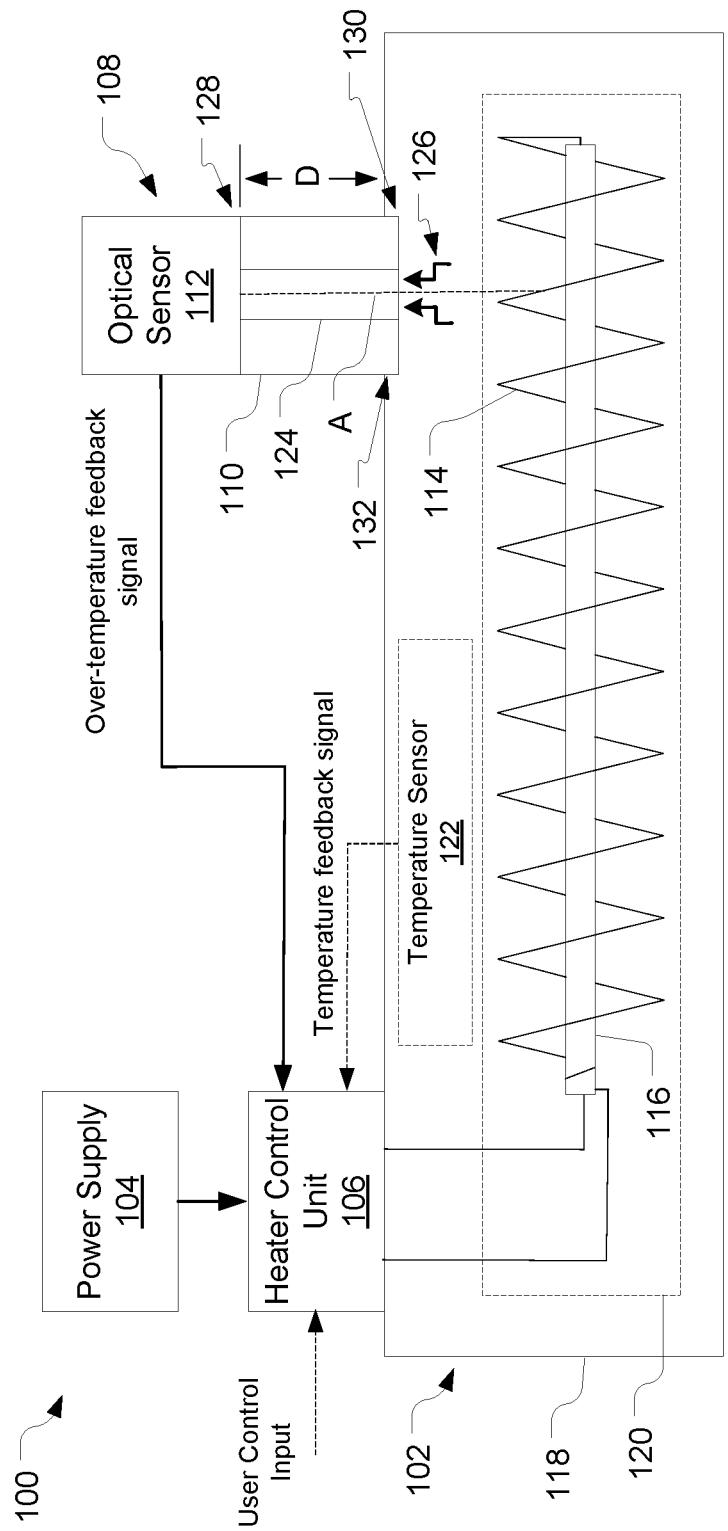
FIG. 1A diagrammatically illustrates a heater system according to embodiments disclosed herein.

In general, a heater according to embodiments disclosed throughout includes a heating element and a sensor assembly including a coupler and an optical sensor. Light emanating from the heating element passes directly through the coupler to the optical sensor. The optical sensor provides an over-temperature feedback signal for limiting power to the heating element when the over-temperature feedback signal exceeds a predetermined threshold. With this configuration, the response time of the optical sensor is fast enough to avoid an over-temperature condition. This configuration also allows operation of the system at a temperature that is close to, but not above, a temperature that would cause an over-temperature condition.

FIG. 1 diagrammatically illustrates an embodiment of a heater system 100 that includes a heater 102, a power supply 104, a heater control unit 106, and a sensor assembly 108 including a coupler 110 and an optical sensor 112. The heater 102 includes an electrically conductive heating element 114 wrapped, e.g. in a serpentine pattern, around a core 116. The core 116 may be a ceramic tube or other construction configured to withstand the heat generated by the heating element 114 in the application.

The heating element 114 is disposed in a housing 118 adapted for the application and may also be, and in some embodiments is, disposed in tube 120, e.g. a clear quartz tubular sleeve. For simplicity and ease of illustration, the heater system 100 is shown in FIG. 1 as including only a single heating element 114. It is to be understood, however, that a system consistent with the present disclosure may include any number of heating elements depending on the application.

The power supply 104 may be, and in some embodiments is, any power supply capable of providing voltage and current output as required to power a given heater element 114, e.g. range 0V to 1000V and higher, and may, and in some embodiments does, provide line current to the heater control unit 106. Opposite ends of the heating element 114 are coupled across outputs of the heater control unit 106. The heater control unit 106 receives line current from the power supply 104 and provides output power to drive the heating element 114 to establish a desired temperature output for the heater 102. In some embodiments, for example, a desired output temperature is established using a user control input to the heater control unit 106, e.g. a dial, switch or electrical threshold setting input.

In some embodiments, an optional temperature sensor 122 disposed in the housing 118 senses the temperature output of the heating element 114 and provides a temperature feedback signal to the heater control unit 106. The temperature sensor 122 is, for example, in some embodiments, a thermocouple or thermistor. The heater control unit 106 may adjust the output power to the heating element 114 in response to the temperature feedback signal from the temperature sensor 122 to maintain the temperature output for the heating element 114 at the desired output temperature established using the user control input.

The sensor assembly 108 provides over-temperature protection for the heating element 114. As used throughout, "over-temperature" refers to a temperature output of the heating element 114 that would damage the heating element 114 so that it no longer operates as required in the intended application and is established as a threshold limit in the heater control unit 106. The coupler 110 of the sensor assembly is coupled to the housing 118 and includes a sight opening 124 to receive light 126 directly from the heating element 114. The sight opening 124 is wavelength transmissive so that the wavelengths from the heating element 114, whether the wavelengths are visible or invisible, pass directly through the sight opening 124 to the optical sensor 112.

Figure 1B:
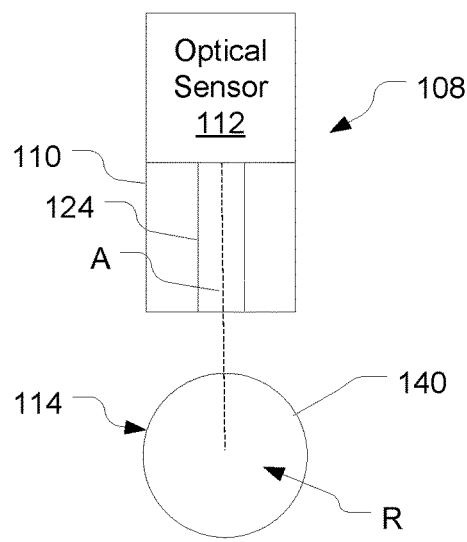
FIG. 1B is a cross-sectional view of a portion of the heater system shown in FIG. 1A illustrating the heater element and the optical sensor assembly.

In FIG. 1A, the sight opening 124 has a central axis A that intersects a region defined by an outer perimeter of the heating element 114. FIG. 1B, for example, is a cross-sectional view showing the heating element 114 and the optical sensor assembly 108 and central axis A. In FIG. 1B, the serpentine heating element 114 has an outer perimeter 114 that defines a circular region R. The central axis A of the sight opening 124 intersects the circular region R. Although the circular region R is circular in FIG. 1B and the central axis A intersects the region R at a diameter of the circle, in some embodiments the outer perimeter 140 of the heating element may not define a circular region and the central axis A may intersect at location other than the center of the region.

The coupler 110 may be constructed from a metal selected to withstand heat generated by the heater 102 and the sight opening 124 may be filled with a wavelength transmissive sight glass to prevent contamination of the sight opening 124 and the optical sensor 112. The optical sensor 112 may be, and in some embodiments is, provided in alignment with the sight opening 124 of the coupler 110 so that any wavelength received directly through the sight opening 124 is directly imparted on a sensing surface of the optical sensor 112. The optical sensor 112 may be, and in some embodiments is, provided in direct contact with the coupler 110 or spaced therefrom at a first end 128 of the coupler 110. A second end 130 of the coupler 110 may be, and in some embodiments is, in direct contact with the housing 118 in alignment with an opening 132 in the housing 118. Wavelength emanating from the heating element 114 passes directly through the opening 126 in the housing 118 (and through the optional tube 120) and directly into the sight opening 124. The coupler 110 may be, and in some embodiments is, secured at the opening 132 in the housing 118, e.g. using mating threads on the coupler 110 and housing 118 and/or by welding the coupler 110 directly to housing 118, so that the housing 118 may be pressurized if desired in the heater application. The length of the coupler 110 may be chosen to establish a safe distance D between the housing 118 and the optical sensor 112 to avoid damage to the optical sensor 112 caused by the temperature of the heater 102.

The optical sensor 112 may be, for example, a known infrared sensor and provides an electrical over-temperature feedback signal to the heater control unit 106 in response to wavelength imparted thereon through the sight opening 124 of the coupler 110. The heater control unit 106 may decrease the output power to the heating element 114 in response to the over-temperature feedback signal from the optical sensor 112 when the over-temperature feedback signal exceeds an over-temperature threshold set in the heater control unit 106. The over-temperature feedback signal from the optical sensor 112 thus protects against an over-temperature condition in the heater.

Advantageously, the optical sensor 112 receives wavelength output directly from the heating element 124 through the sight opening 124 in the coupler 110. With this configuration, a temperature feedback signal to the heater control unit 106 can be established very quickly to avoid an over-temperature condition. Also, when the optical sensor 112 is configured as an infrared sensor, since the optical sensor 112 receives wavelength directly from the heating element 114, the optical sensor 112 provides an over-temperature feedback signal even when the wavelength imparted on the optical sensor 112 from the heating element 114 is only in the infrared range with no readily visible color. This allows detection of an over-temperature condition before the heating element 114 reaches a visible color, thereby reducing latency in detecting an over-temperature condition. In embodiments that do not include a temperature sensor 122, the output of the optical sensor 112 may also be used to maintain the temperature output for the heating element 114 at the desired output temperature established using the user control input.

Figure 2:
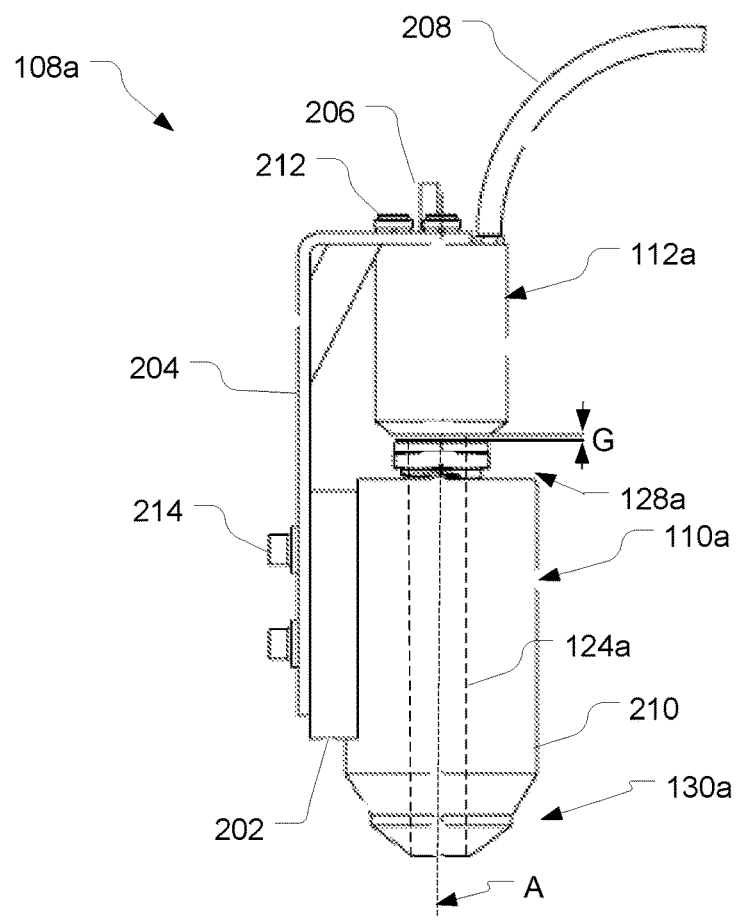
FIG. 2 is a side view of an embodiment of an optical sensor assembly according to embodiments disclosed herein.

FIG. 2 is a side view of an embodiment of a sensor assembly 108a, which includes a coupler 110a, and optical sensor 112a, a plate 202, a bracket 204, an over-temperature feedback signal wire 206, and a coolant hose 208. The coupler 112a has a generally cylindrical body 210 with a first end 128a having an extension and a stepped conical second end 130a. The stepped conical second end 130a is configured to be received within an opening 132 (FIG. 1.) in a housing 118 of a heater 102. A sight opening 124a, shown in phantom in FIG. 2, extends from the first end 128a of the coupler 110a to the second end 130a of the coupler 110a and, in some embodiments, may be filled with glass to prevent contamination of the optical sensor 112a. The body 210 of the coupler and the sight glass are constructed from material that can withstand the heat of the heater 102.

The optical sensor 112a is optically aligned with the sight opening 124a of the coupler 110a so that wavelength emanated from the heating element 114 (FIG. 1) passes directly through the sight opening 124a and is directly imparted on the optical sensor 112a. The coolant hose 208 is coupled to a ferrule on the optical sensor 112a and provides coolant, e.g. air, from a coolant source and through the interior of the optical sensor 112a. The wire 206 may be a thermocouple wire and used to couple the output of the optical sensor 112a to the heater control unit 106 (FIG. 1). A variety of optical sensor configurations may be used in a system consistent with the present disclosure. The optical sensor 112a may, for example, be a model number IRtc.10A-K-LoE infrared sensor or a model number IRt/c.2/15ACF infrared sensor, both of which are commercially available from Exergen Corporation of Watertown, Mass., USA.

The optical sensor 112a is coupled to the coupler 110a through the bracket 204 and the plate 202. The plate 202 is constructed from metal and is configured to provide an interface between the generally cylindrical body 210 of the coupler 110a and the flat bracket 204. The bracket 202 is coupled to the top of the optical sensor 112a using fasteners, e.g. fastener 212, and to the side of the coupler 110a through the plate 202 using fasteners, e.g. fastener 214. The bracket 204 is dimensioned to provide alignment of the center axis A of the sight opening 124a with the sensor surface of optical sensor 112a and to allow for a desired axial positioning of the optical sensor 112a to the coupler 110a. In some embodiments, for example, the optical sensor 112a and the coupler 110a are coupled to the bracket 204 to provide an air gap G between the optical sensor 112a and the coupler 110a. In some embodiments, for example, the air gap G may be about $1/16"$. The air gap G prevents direct heat transfer from the coupler 110a to the optical sensor 112a to avoid damage to the optical sensor 112a. In some embodiments the air gap G may not be necessary and the optical sensor 112a and coupler 110a may be provided in direct contact.

Figure 3:
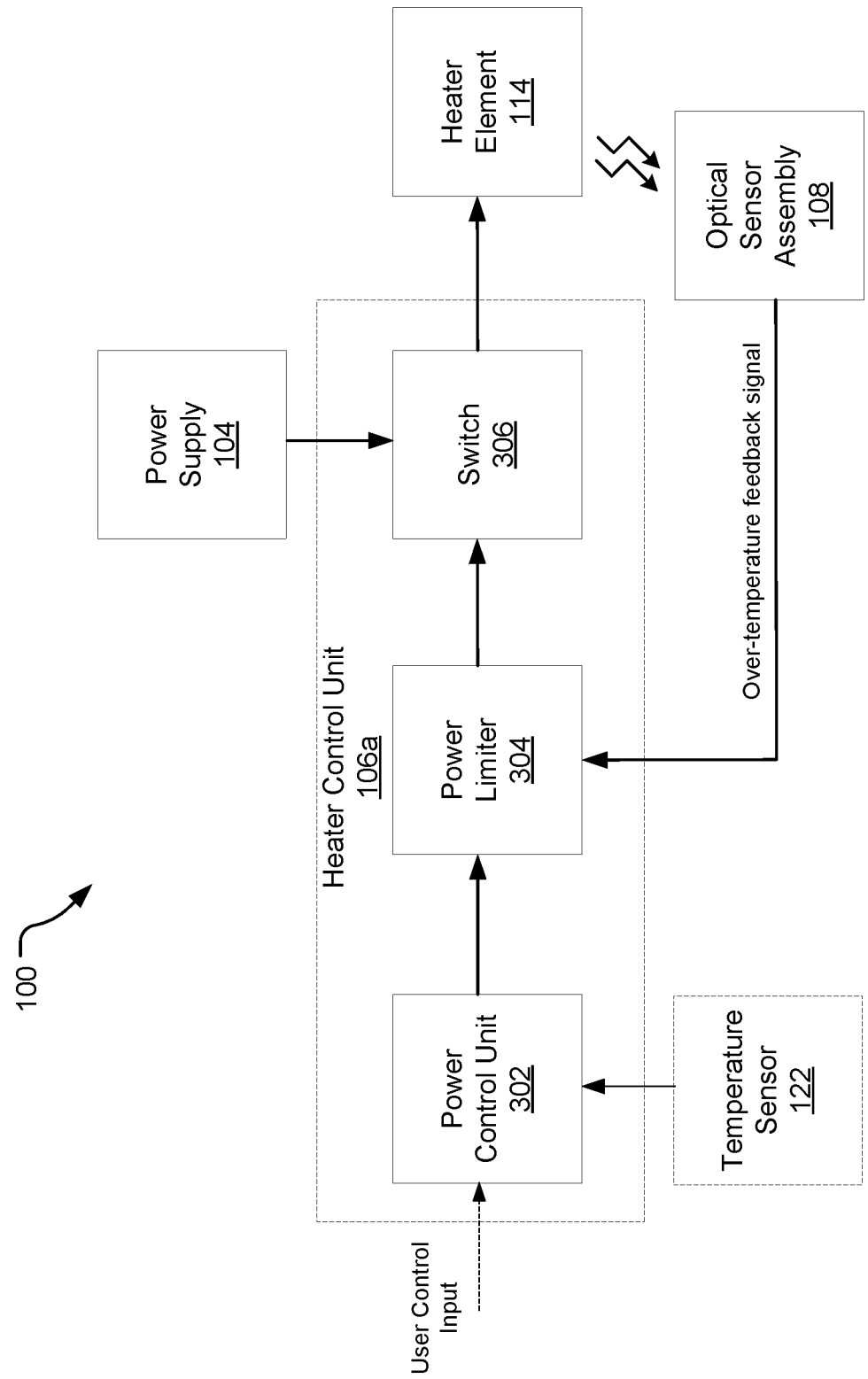
FIG. 3 is block diagram of a system according to embodiments disclosed herein.

With reference again to FIG. 1A, the output of the sensor assembly 108 is coupled to the heater control unit 106 to avoid an over-temperature condition in the heater 102. The heater control unit 106 may be provided in a variety of configurations. FIG. 3, for example, illustrates one embodiment of a heater control unit 106a useful in connection with a system consistent with the present disclosure. In FIG. 3, the heater control unit 106a includes a power control unit 302, a power limiter 304 and a switch 306. Although the illustrated embodiment shows the power control unit 302, the power limiter 304, and the switch 306 as separate functional blocks, it should be understood that the functions of any or all of the blocks may be combined into a component or may be separated into a separate components.

In FIG. 3, the power control unit 302 is coupled to the switch through the power limiter 304 and is configured to provide an output signal to control the switch 306 to establish a desired output temperature for the heater element 114. The desired output temperature may be established using a user control input to the heater control unit 106, e.g. a dial, switch or electrical threshold setting input. In some embodiments, the optional temperature sensor 122 disposed in the housing 118 may sense the temperature output of the heating element 114 and provide a temperature setting feedback signal to the power control unit 302. A variety of power control unit 302 configurations may be used in a system consistent with the present disclosure. The power control unit 302, for example, may be a model number FDC-8300 temperature controller commercially available from Future Design Controls, Inc. of Bridgeview, Ill., USA.

The switch 306 may be configured to rectify the output of the power supply (when the power supply provides an AC output) and couples a portion of the power supply output to the heating element 114 in response to the output of the power control unit 302. A variety of switch 306 configurations may be used in a system consistent with the present disclosure. The switch 306 may, for example, be configured as a silicon controlled rectifier (SCR) that provides a portion of the power supply 104 output to the heater element 114 that is determined by the input signal to the rectifier, e.g. from the power control unit 302 and/or the power limiter 304. In some embodiments, for example, the switch 306 may be an A1P series single phase SCR power controller commercially available from Avatar Instruments of Lewes, Del., USA.

In the illustrated embodiment, the power limiter 304 is coupled between the power control unit 306 and the switch 306. The power limiter 304 is configured to receive the over-temperature feedback signal from the optical sensor assembly 108. When the over-temperature feedback signal is below a predetermined threshold established in the power limiter 304, the power limiter 304 passes the output of the power control unit 302 to the switch 306. When the over-temperature feedback signal exceeds the predetermined threshold established in the power limiter 304, the power limiter 304 provides a reduced output to the switch 306 compared to the output of the power control unit 302 to protect the heating element 114 from an over-temperature condition.

In some embodiments, for example, the power control unit 302 may provide an output between about 4-20 mA and in response thereto the switch may provide between 0-97% of the power supply 104 output to the heater element 114. When the over-temperature feedback signal exceeds the predetermined threshold, the power limiter 304 may either provide no output the switch 306, thereby turning the heater element 114 off, or provide a reduced output to the switch 306 to reduce the power supply output to the switch 306. Advantageously, since the optical sensor assembly 108 has a fast response time due to direct sight to the heater element 114 the power limiter 304 can limit the output to the switch 306 to operate the heating element 114 at a temperature that is close to but not above a temperature that would cause an over-temperature condition. This allows the system 100 to provide a temperature output that is close to the maximum achievable temperature output of the system 100.

The power limiter 304 may be provided in a variety of configurations. For example, the power limiter 304 may be configured using analog and/or digital components. In an analog configuration, the power limiter 304 may include a comparator circuit that sets the threshold for the over-temperature feedback signal. The power limiter may also or alternatively be configured using a processor configured to receive the over-temperature feedback signal and provide an output signal to the switch determined by software instructions executed by a processor. In one embodiment, for example, the power limiter 304 may be a 2-TCLimit card commercially available from Avatar Instruments of Lewes, Del., USA.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system comprising:
    a heating element, the heating element further comprising a resistive wire;
    a sensor assembly, the sensor assembly comprising
        a coupler having a sight opening configured to receive a wavelength directly from the resistive wire, and
        an optical sensor configured to receive the wavelength from the resistive wire directly through the sight opening of the coupler, the optical sensor being configured to provide an over-temperature feedback signal in response to the wavelength from the resistive wire, the over-temperature feedback signal being representative of a temperature of the resistive wire; and
    a heater controller configured to drive the resistive wire to a desired temperature of the resistive wire, the heater controller being further configured to limit power delivered to the resistive wire in response to the over-temperature feedback signal.

2. The system of claim 1, wherein the sight opening faces at least a portion of the resistive wire.

3. The system of claim 1, wherein the resistive wire is disposed in a housing having an opening therein, and wherein the coupler is coupled to the housing to receive the wavelength from the resistive wire through the opening.

4. The system of claim 1, further comprising:
    a temperature sensor configured to provide a temperature feedback signal to heater controller, the heater controller being configured to drive the resistive wire to the desired temperature in response to the temperature feedback signal.

5. The system of claim 1, wherein the optical sensor is an infrared (IR) sensor.

6. The system of claim 1, wherein the heater controller comprises a power controller and a power limiter, the power controller configured to provide a control signal to drive the resistive wire to the desired temperature and the power limiter configured to limit power delivered to the resistive wire by limiting the control signal in response to the over-temperature feedback signal.

7. The system of claim 6, wherein the heater controller further comprises a switch configured to switch power from a power supply to the resistive wire in response to the control signal from the power controller.

8. The system of claim 6, further comprising:
    a temperature sensor configured to provide a temperature feedback signal to the power controller, the power controller being configured to provide the control signal in response to the temperature feedback signal.

9. The system of claim 1, wherein the coupler is coupled to the optical sensor through a bracket.

10. The system of claim 9, wherein an air gap is provided between the coupler and the optical sensor.

11. A system comprising:
    a heating element;
    a sensor assembly, the sensor assembly comprising
        a coupler having a sight opening configured to receive a heating element wavelength directly from the heating element, and
        an optical sensor configured to receive the heating element wavelength directly through the sight opening of the coupler, the optical sensor being configured to provide an over-temperature feedback signal in response to the heating element wavelength, the over-temperature feedback signal being representative of a temperature of the heating element; and
    a heater controller configured to drive the heating element to a desired temperature, the heater controller being further configured to limit power delivered to the heating element in response to the over-temperature feedback signal, wherein the system further comprising coolant hose coupled to the optical sensor to provide a coolant to the sensor.

12. A system comprising:
    a heating element disposed in a housing, the heating element comprising a resistive wire, the housing having an opening therein;
    a sensor assembly, comprising:
    a coupler coupled to the housing and having a sight opening configured to receive a wavelength directly from the resistive wire through the opening in the housing, the sight opening having a central axis that intersects a region defined by an outside dimension of the resistive wire; and
    an optical sensor configured to receive the wavelength from the resistive wire directly through the sight opening of the coupler, the optical sensor being configured to provide an over-temperature feedback signal in response to the wavelength from the resistive wire, the over-temperature feedback signal being representative of a temperature of the resistive wire;

a temperature sensor configured to provide a temperature feedback signal; and a heater controller configured to drive the resistive wire to a desired temperature of the resistive wire in response to the temperature feedback signal, the heater controller being further configured to limit power delivered to the resistive wire in response to the over-temperature feedback signal.

13. The system of claim 12, wherein the heater controller comprises a power controller and a power limiter, the power controller configured to provide a control signal to drive the resistive wire to the desired temperature and the power limiter configured to limit power delivered to the resistive wire by limiting the control signal in response to the over-temperature feedback signal.

14. The system of claim 13, wherein the heater controller further comprises a switch configured to switch power from a power supply to the resistive wire in response to the control signal from the power controller.

15. A method of protecting a heating element comprising a resistive wire from an over-temperature condition, comprising:

delivering power from a power supply to the resistive wire to achieve a desired temperature of the resistive wire;

receiving wavelength directly from the resistive wire;

sensing the wavelength from the resistive wire to provide a temperature feedback signal representative of an actual temperature of the resistive wire; and limiting the power delivered from the power supply to the resistive wire in response to the temperature feedback signal when the actual temperature of the resistive wire exceeds a predetermined over-temperature threshold.

16. The method of claim 15, further comprising:

sensing a temperature of the resistive wire to provide a temperature feedback signal, wherein power is delivered from the power supply in response to the temperature feedback signal.

* * * * *